R. M. HINE.
Hay and Manure Fork.
No. 10,384.
Patented Jan. 3, 1854.
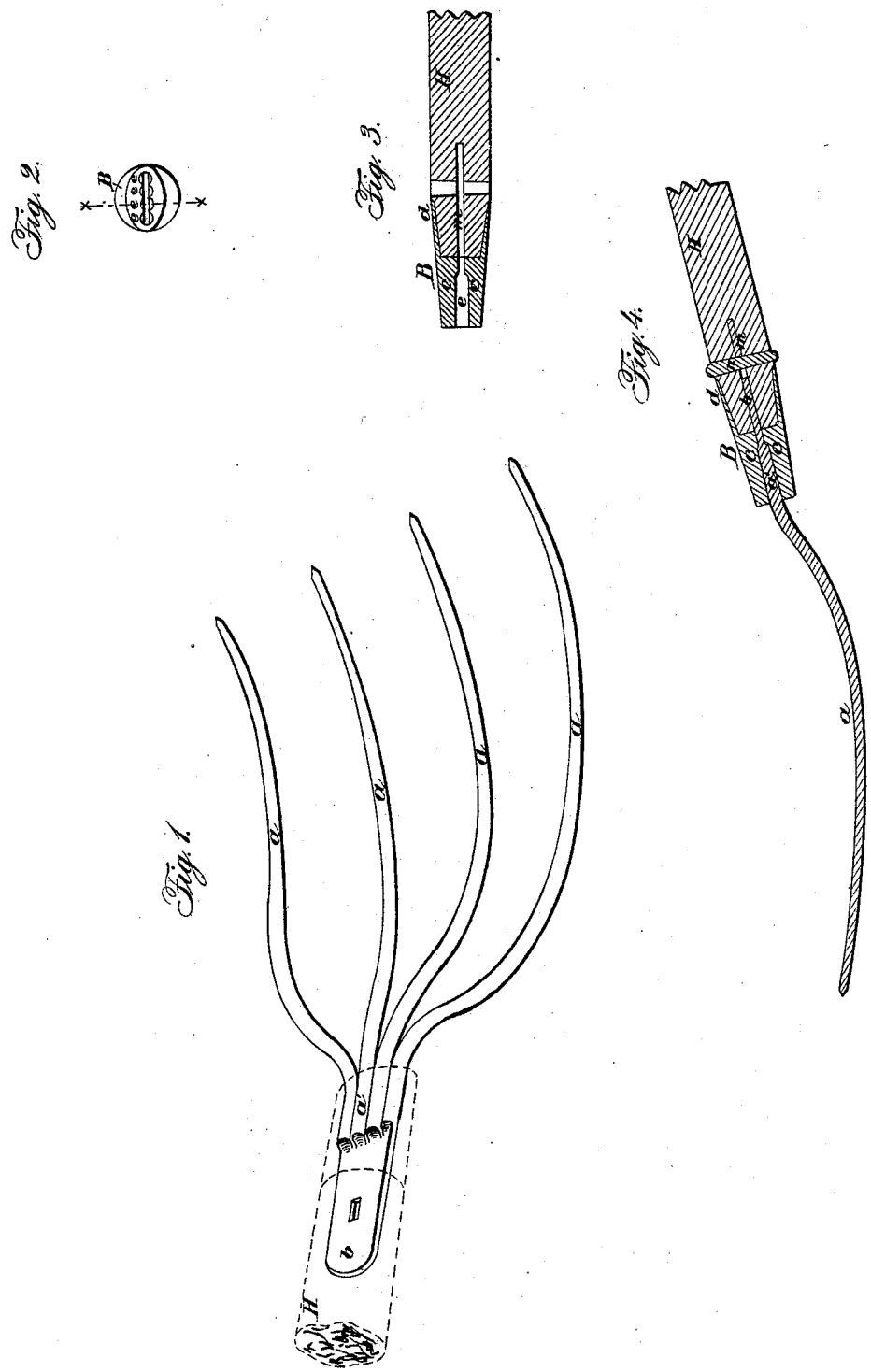

UNITED STATES PATENT OFFICE.

R. M. HINE, OF MENTZ, ASSIGNOR TO SILSBY & HINE, OF SENECA FALLS, NEW YORK.

IMPROVEMENT IN SHANKS OF HAY AND MANURE FORKS.

Specification forming part of Letters Patent No. 10,384, dated January 3, 1854.

*To all whom it may concern:*

Be it known that I, REUBEN M. HINE, of Mentz, in the county of Cuyuga and State of New York, have invented certain new and useful Improvements in Hay and Manure Forks, of which the following is a full, clear, and exact description, reference being had to the accompanying drawings, which make part of this specification, and in which—

Figure 1 represents a view in perspective of a four-pronged fork detached from its handle; Fig. 2, an end of the handle; Fig. 3, a longitudinal section of the same, taken through the line $x\ x$ of Fig. 2; and Fig. 4, a similar section of the handle and prongs.

My invention and improvement consist in constructing the ferrule in such manner that it will support each prong separately, while at the same time it will admit them united together into a common tang, thus allowing them to be firmly connected to the handle in the manner of the ordinary fork, with an additional support by the ferrule of each individual prong, which adds greatly to the strength and durability of the implement.

I have represented the invention as applied to a four-pronged dung-fork; but it is applicable to all descriptions of forks with two or more prongs.

The prongs $a$ of the fork are of tapered steel wire, bent into the usual shape up to the point where they enter the handle. From this point they are made straight and parallel for a short distance, and then welded together and beaten out into the proper shape to form the tang $b$, which is pierced with a hole to admit a key, that passes through the tang and handle to keep them firmly united. The tang, formed by welding the upper extremities of the prongs together, is only about one-third of the thickness of the prongs, so that it can pass through the sockets of the ferrule for the straight part $a'$ of the prongs.

The ferrule B is made with a thick and solid end, $c$, in which sockets $e$, for the straight and parallel part $a'$ of the prongs to fit into, and a slot, $m$, for the tang $b$ to pass through into the handle, are formed; and the upper end, $d$, of the ferrule forms a large socket to receive the end of the handle H, through which a key or wedge, $n$, is passed, that unites the fork, ferrule, and handle firmly together.

The sockets $e$ are of the same diameter and length as the parallel parts $a'$ of the prongs which fit therein, and the slot or oblong perforation $m$ is of the width and thickness of the solid part of the tang.

The prongs by this arrangement are welded at a point far within the ferrule, and where they are so well supported that the weakening of the metal by the welding does not endanger the breaking off of the prongs, as in the ordinary fork, where the weld constitutes the chief support of the prong, this insures a greatly-increased durability of the fork.

When the fork is made with an even number of prongs a piece of wire long enough to form each pair may be bent in the middle and properly shaped at that point to form the tang.

What I claim as my invention, and desire to secure by Letters Patent, is—

The fork with the upper part, $a'$, of its prongs and its tang $b$ constructed as herein described, in combination with the ferrule B, with sockets $e$ and slot $m$, as herein described.

In testimony whereof I have hereunto subscribed my name.

REUBEN M. HINE.

Witnesses:
 NATHAN BAKER,
 GEO. W. S. MILLER.